（12）United States Patent
Basarik et al.

(10) Patent No.: US 11,440,441 B2
(45) Date of Patent: Sep. 13, 2022

(54) SEAT TRACK MECHANISM (71) Applicant: Lear Corporation, Southfield, MI (US)

(72) Inventors: Slavomir Basarik, Presov (SK);
Miroslav Dedina, Presov (SK); Pavol Plocar, Presov (SK); Marian Podhorsky, Presov (SK); Peter Stutika, Presov (SK); Marian Tkac, Presov (SK); Michael Wojatzki, Ennigerloh (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/840,836

(22) Filed: Apr. 6, 2020

(65) Prior Publication Data

US 2020/0398705 A1 Dec. 24, 2020

(30) Foreign Application Priority Data

Jun. 21, 2019 (DE) ................... 10 2019 209 038.9

(51) Int. Cl.
*B60N 2/08* (2006.01)

(52) U.S. Cl.
CPC ......... *B60N 2/0881* (2013.01); *B60N 2/0818* (2013.01); *B60N 2/0831* (2013.01)

(58) Field of Classification Search
CPC .. B60N 2/0812; B60N 2/0818; B60N 2/0837; B60N 2/0843; B60N 2/123; B60N 2/0831; B60N 2/085; B60N 2/0881
See application file for complete search history.

(56) References Cited

U.S. PATENT DOCUMENTS

| 4,621,867 | A | | 11/1986 | Perring et al. | |
|---|---|---|---|---|---|
| 5,688,026 | A | * | 11/1997 | Reubeuze | B60N 2/123 248/429 |
| 6,227,596 | B1 | * | 5/2001 | Foucault | B60N 2/123 296/65.13 |
| 7,523,913 | B2 | * | 4/2009 | Mizuno | B60N 2/123 248/429 |
| 8,141,953 | B2 | * | 3/2012 | Quast | B60N 2/0806 297/341 |
| 8,517,328 | B2 | | 8/2013 | Wieclawski et al. | |
| 8,585,145 | B2 | | 11/2013 | Nock et al. | |
| 8,757,720 | B2 | | 1/2014 | Hurst, III et al. | |
| 8,857,763 | B2 | * | 10/2014 | Brand | B60N 2/0745 297/143 |

(Continued)

FOREIGN PATENT DOCUMENTS

| CN | 102112339 A | 6/2011 |
|---|---|---|
| CN | 102198811 A | 9/2011 |

(Continued)

OTHER PUBLICATIONS

German Office Action dated Feb. 18, 2020, for related German Application. No. 102019209038.9; 12 Pages.

(Continued)

*Primary Examiner* — Jonathan Liu
*Assistant Examiner* — Guang H Guan
(74) *Attorney, Agent, or Firm* — Brooks Kushman PC (57) ABSTRACT

A seat track mechanism for a vehicle seat. The seat track mechanism may include an upper track, a lower track, a lever, and a retainer bracket. The lever may be pivotable between a first position and a second position and may have a latch arm. The retainer bracket may define a slot that may receive the latch arm to hold the lever in the second position.

20 Claims, 8 Drawing Sheets

(56) References Cited

U.S. PATENT DOCUMENTS

| | | | |
|---|---|---|---|
| 8,967,719 B2 | 3/2015 | Ngiau et al. | |
| 9,108,535 B2 | 8/2015 | Teufel et al. | |
| 9,156,376 B2 * | 10/2015 | Yamada | B60N 2/085 |
| 9,340,125 B2 | 5/2016 | Stutika et al. | |
| 9,393,883 B2 * | 7/2016 | Wojatzki | B60N 2/0887 |
| 9,758,061 B2 * | 9/2017 | Pluta | B60N 2/206 |
| 9,776,532 B2 | 10/2017 | Stutika et al. | |
| 9,919,624 B2 * | 3/2018 | Cziomer | B60N 2/07 |
| 10,081,271 B2 * | 9/2018 | Goto | B60N 2/085 |
| 10,131,251 B2 * | 11/2018 | Harvey | B60N 2/085 |
| 10,919,415 B2 * | 2/2021 | Emrich | B60N 2/0705 |
| 11,077,772 B2 * | 8/2021 | Brewer | B60N 2/0705 |
| 2006/0091278 A1 | 5/2006 | McCulloch et al. | |
| 2009/0058169 A1 * | 3/2009 | Soga | B60N 2/0875 297/463.1 |
| 2012/0074287 A1 | 3/2012 | Wojatzki et al. | |
| 2020/0398705 A1 * | 12/2020 | Basarik | B60N 2/0705 |
| 2021/0107382 A1 * | 4/2021 | Stutika | B60N 2/0843 |

FOREIGN PATENT DOCUMENTS

| | | |
|---|---|---|
| CN | 103253158 A | 8/2013 |
| CN | 103448576 A | 12/2013 |
| CN | 203739687 U | 7/2014 |
| CN | 105189194 A | 12/2015 |
| DE | 102012205485 A1 | 7/2013 |
| DE | 102013210329 A1 | 12/2013 |
| DE | 102015220262 A1 | 2/2017 |
| DE | 102016113409 A1 | 4/2017 |
| DE | 102018200710 A1 | 7/2018 |
| FR | 2983794 A1 | 6/2013 |
| JP | 2009248697 A | 10/2009 |

OTHER PUBLICATIONS

China Office Action dated Apr. 13, 2022, for related China Application. No. 202010260037.3; 9 Pages.

* cited by examiner

SEAT TRACK MECHANISM

CROSS-REFERENCE TO RELATED APPLICATIONS

This application claims the benefit of German patent application Serial No. DE102019209038.9 filed Jun. 21, 2019, the disclosure of which is hereby incorporated in its entirety by reference herein.

TECHNICAL FIELD

This disclosure relates to a seat track mechanism that facilitates positioning of a vehicle seat.

BACKGROUND

A track adjuster that may be used in connection with a vehicle seat is disclosed in U.S. Pat. No. 9,340,125.

SUMMARY

In at least one embodiment, the seat track mechanism is provided. The seat track mechanism may include a lower track, an upper track, a lever, and a retainer bracket. The upper track may be received in the lower track and may be slidable with respect to the lower track. The lever may be received in the upper track and may be pivotable between a first position and a second position. The lever may have a latch arm that may extend toward the lower track. The retainer bracket may be received in the lower track. The retainer bracket may define a slot that may receive the latch arm to hold the lever in the second position.

In at least one embodiment, a seat track mechanism is provided. The seat track mechanism may include a lower track, an upper track, a lever, a retainer bracket, and a track locking mechanism. The upper track may be received in the lower track and may be slidable along an axis with respect to the lower track. The lever may be pivotally coupled to the upper track and may have a latch arm. The retainer bracket may be received in the lower track and may define a slot. The track locking mechanism may have a lock plate that may be arranged between the upper track and the lower track. The lock plate may be movable between a locked position and an unlocked position. The lock plate may engage the upper track and the lower track to inhibit axial movement of the upper track with respect to the lower track in the locked position. The lock plate may be disengaged from the lower track to permit axial movement of the upper track with respect to the lower track in the unlocked position. The lever may engage the lock plate to actuate the lock plate from the locked position to the unlocked position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
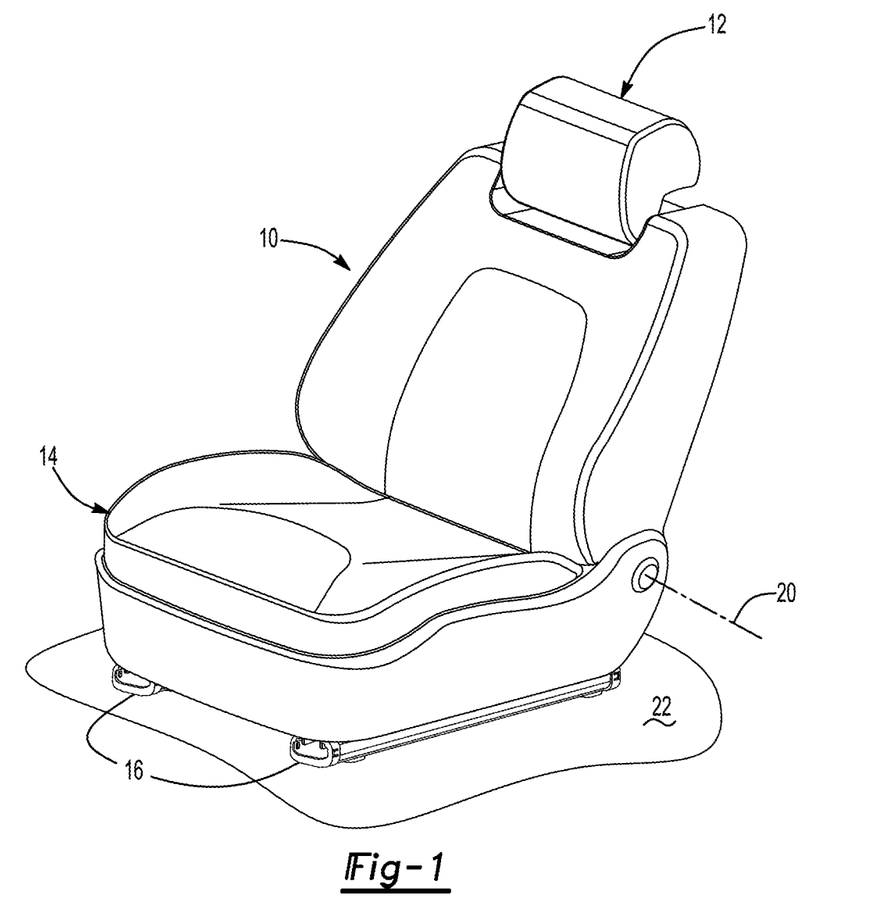
FIG. 1 is a perspective view of a seat assembly.

Referring to FIG. 1, an example of a seat assembly 10 is shown. The seat assembly 10 may be configured for use with a vehicle, such as a motor vehicle like a car or truck, aircraft, or marine vessel. The seat assembly 10 may include a seat back 12, a seat bottom 14, and a pair of seat track mechanisms 16.

The seat back 12 may be configured to support the back of a seat occupant. The seat back 12 may be pivotal about an axis 20 with respect to the seat bottom 14. For example, a pair of recliner mechanisms may pivotally connect the seat back 12 to the seat bottom 14. The recliner mechanisms may allow the seat back 12 to pivot forward and backward with respect to a generally upright design position or a seating position in which the seat assembly 10 may receive a seat occupant.

The seat bottom 14 may be configured to support a seat occupant. The seat bottom 14 may be mounted to a pair of seat track mechanisms 16 which in turn may be mounted on a support surface 22, such as a portion of a vehicle body structure like a floor pan.

The seat track mechanism 16 may permit longitudinal movement of the seat assembly 10 in a forward/backward direction or movement along a longitudinal axis 24 with respect to the support surface 22. The longitudinal axis 24 may be disposed perpendicular to the axis 20 and may be disposed in a generally horizontal plane.

Figure 2:
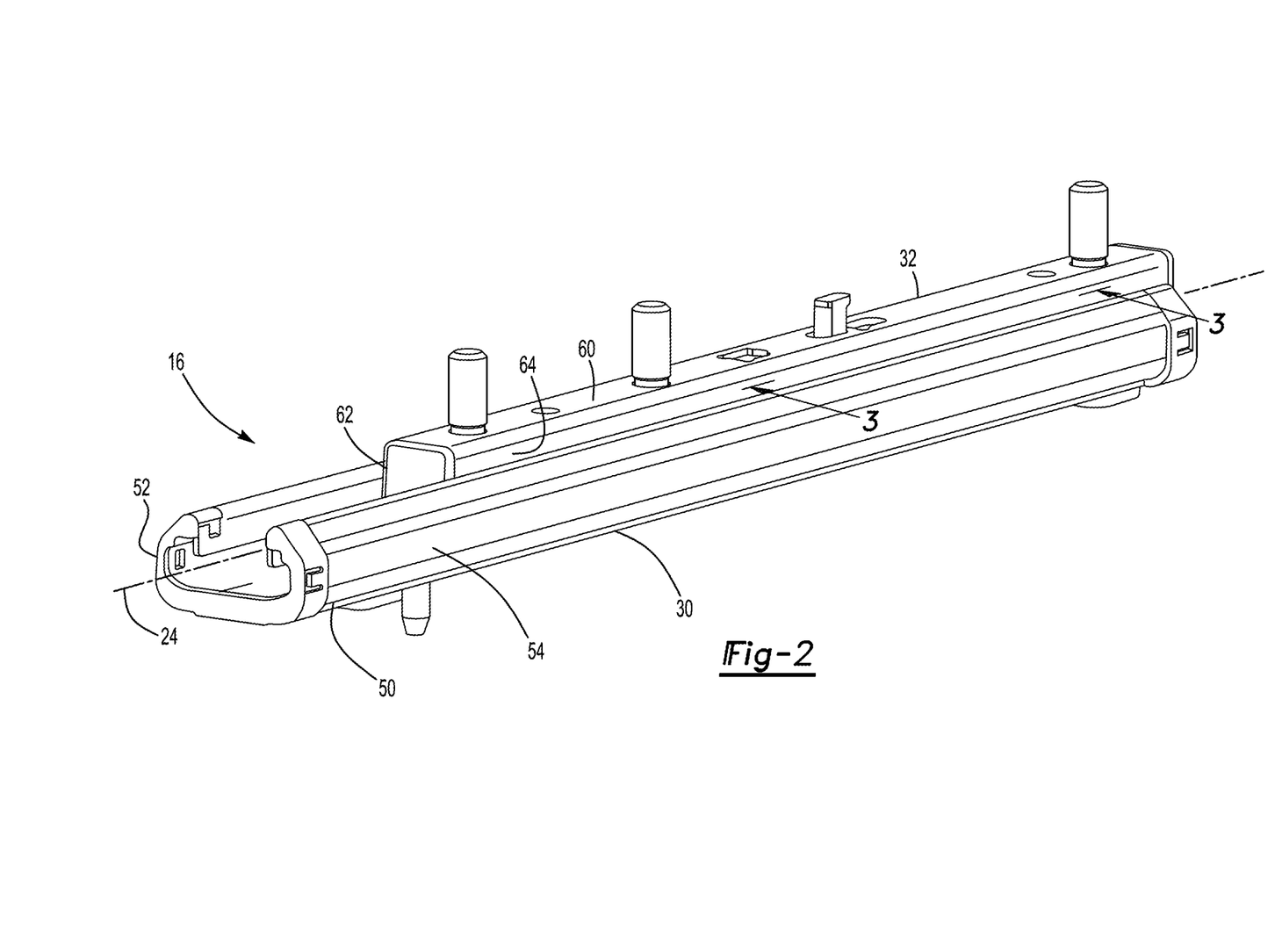
FIG. 2 is a perspective view of a seat track mechanism that may be provided with the seat assembly.
Figure 3:
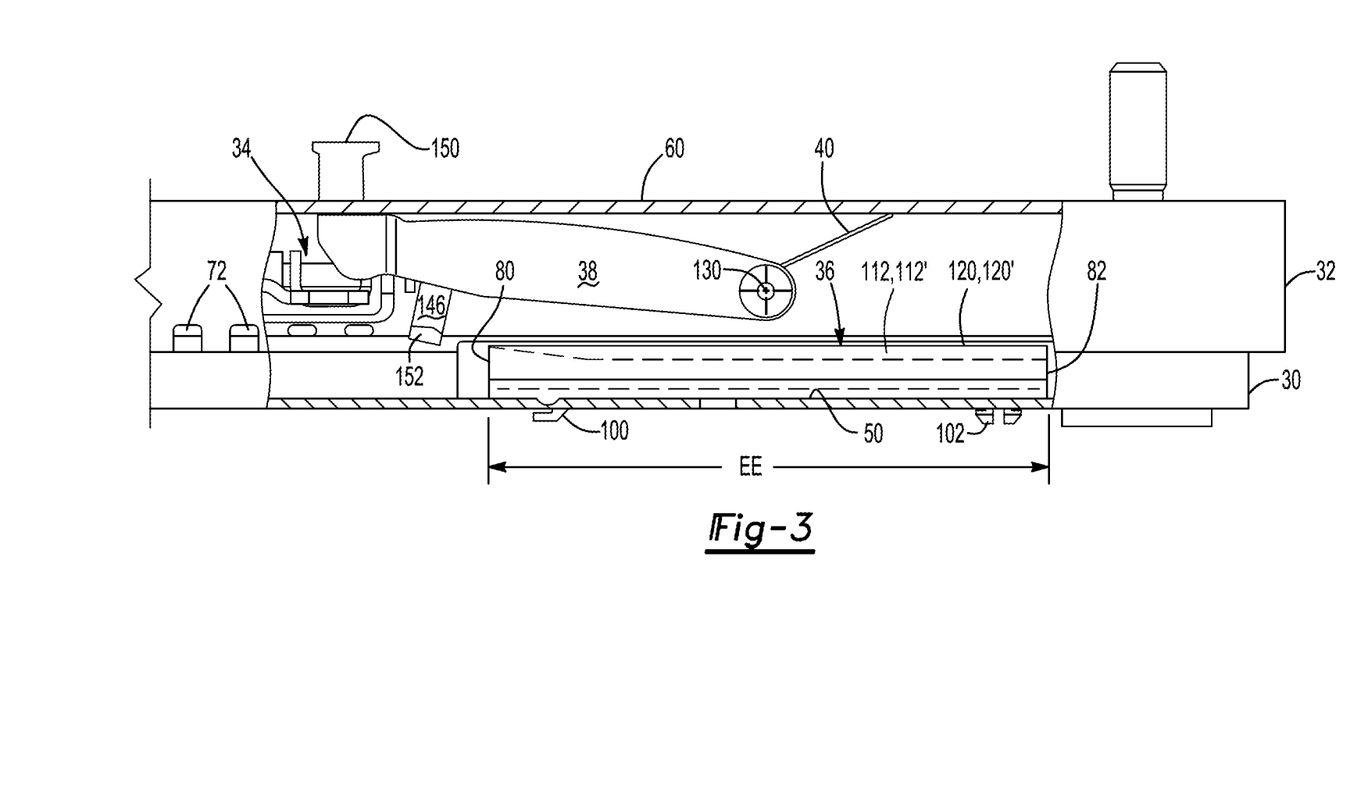
FIG. 3 is a fragmentary section view of the seat track mechanism along section line 3-3 showing a lever in a first position.
Figure 4:
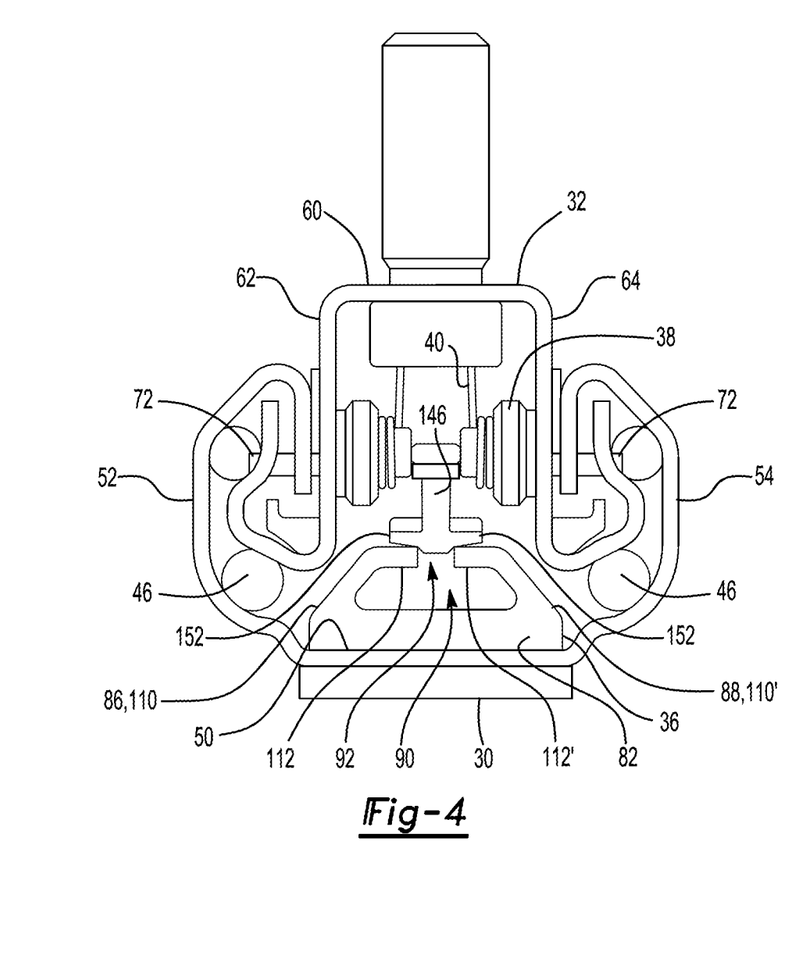
FIG. 4 is an end view of the seat track mechanism of FIG. 3.

Referring to FIGS. 2-4, an example of a seat track mechanism 16 is shown. The seat track mechanism 16 may include a lower track 30, an upper track 32, a track locking mechanism 34, a retainer bracket 36, a lever 38, and a biasing member 40.

The lower track 30 may be configured to be fixedly mounted on the support surface 22. For example, the lower track 30 may be coupled to the support surface 22 with one or more fasteners such as bolts, pins, or the like. In at least one configuration, the lower track 30 may include a bottom wall 50, a first side wall 52, and a second side wall 54 as is best shown in FIGS. 2 and 4.

The bottom wall 50 may be disposed proximate the support surface 22. As such, the bottom wall 50 may be disposed below the upper track 32 and may be disposed at the bottom of the lower track 30. In at least one configuration, the bottom wall 50 may be substantially planar and may extend from the first side wall 52 to the second side wall 54.

The first side wall 52 may extend from a first lateral end of the bottom wall 50. The first side wall 52 may extend in a generally upward direction and may have a distal end that may hook over the upper track 32. A plurality of notches may be disposed proximate or may extend from the distal end of the first side wall 52. A notch may be configured to receive a portion of the track locking mechanism 34 to inhibit movement of the upper track 32 with respect to the lower track 30 as will be discussed in more detail below.

The second side wall 54 may extend from a second lateral end of the bottom wall 50. As such, the second side wall 54 may be disposed opposite the first side wall 52. In addition, the second side wall 54 may have mirror symmetry with the first side wall 52. As such, the second side wall 54 may extend in a generally upward direction and may have a distal end that may hook over another portion of the upper track 32. A plurality of notches may also be disposed proximate or may extend from the distal end of the second side wall 54.

The upper track 32 may be at least partially received in the lower track 30. In addition, the upper track 32 may be spaced apart from the lower track 30. The upper track 32 may be slidable with respect to the lower track 30 along the longitudinal axis 24 or in a direction that may extend parallel to the longitudinal axis 24 with respect to the lower track 30. For instance, a plurality of bearing elements 46, which are best shown in FIG. 4, may be received in the lower track 30 and may extend from the lower track 30 to the upper track 32 to support the upper track 32 and facilitate axial movement of the upper track 32. In at least one configuration, the upper track 32 may include a top wall 60, a first side wall 62, and a second side wall 64.

The top wall 60 may be disposed proximate the seat bottom 14. In addition, the top wall 60 may be coupled to the seat bottom 14 and may support the seat bottom 14. The top wall 60 may be disposed above the lower track 30 and may be disposed at the top of the upper track 32. In at least one configuration, the top wall 60 may be substantially planar and may extend from the first side wall 62 to the second side wall 64.

The first side wall 62 may extend from a first lateral end of the top wall 60. The first side wall 62 may extend in a generally downward direction toward the bottom wall 50 of the lower track 30 and then subsequently bend and extend upward such that the distal end of the first side wall 52 of the lower track 30 may be received between the downward and upward extending portions of the first side wall 62 of the upper track 32. A plurality of notches may be provided in the first side wall 62. For example, notches may be provided in the downward and upward extending portion of the first side wall 62. A notch may be configured to receive a portion of the track locking mechanism 34 to inhibit movement of the upper track 32 with respect to the lower track 30 as will be discussed in more detail below.

The second side wall 64 may extend from a second lateral end of the top wall 60. As such, the second side wall 64 may be disposed opposite the first side wall 62. In addition, the second side wall 64 may have mirror symmetry with the first side wall 62. As such, the second side wall 64 may extend in a generally downward direction toward the bottom wall 50 and subsequently bend and extend upward such that the distal end of the second side wall 54 of the lower track 30 may be received between the downward and upward extending portions of the second side wall 64. The second side wall 64 may also include a plurality of notches like the first side wall 62.

Figure 7:
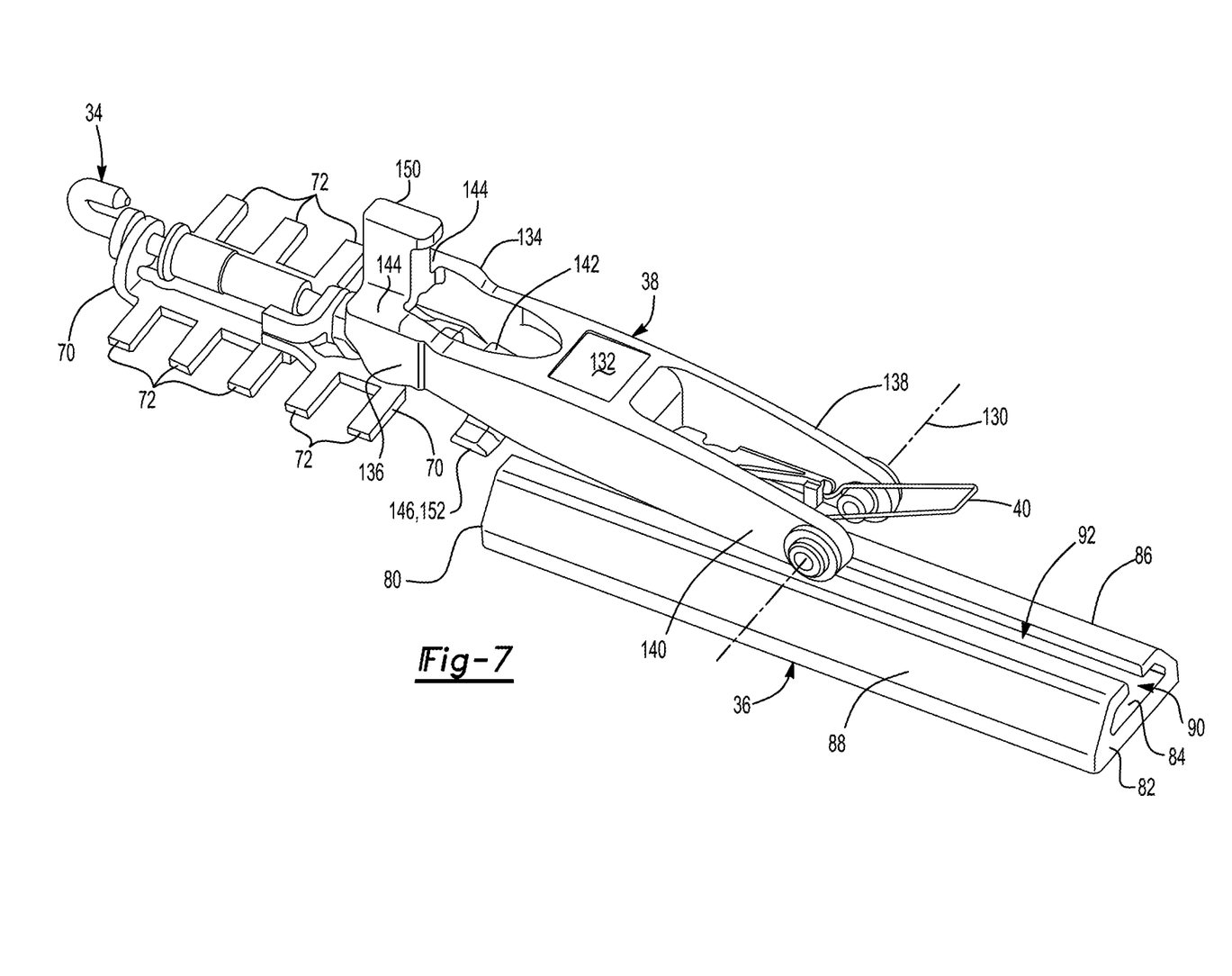
FIG. 7 is a perspective view of the lever, a retainer bracket, and a track locking mechanism of the seat track mechanism.

Referring primarily to FIGS. 3, 4 and 7, the track locking mechanism 34 is shown. The track locking mechanism 34 may selectively couple and decouple the upper track 32 to the lower track 30. The track locking mechanism 34 may have any suitable configuration. For example, the track locking mechanism 34 may have one or more lock plates 70 that may be arranged between the lower track 30 and the upper track 32. The lock plate 70 may have one or more locking arms 72 and may be movable between a locked position and an unlocked position.

In the locked position, the lock plate 70 may engage the lower track 30 and the upper track 32 to inhibit axial movement of the upper track 32 with respect to the lower track 30. For example, a locking arm 72 may extend through at least one notch in the upper track 32 and a corresponding notch in the lower track 30 when the lock plate 70 is in the locked position. A locking arm 72 may extend in a generally horizontal direction when in the locked position as is best shown in FIG. 4.

Figure 6:
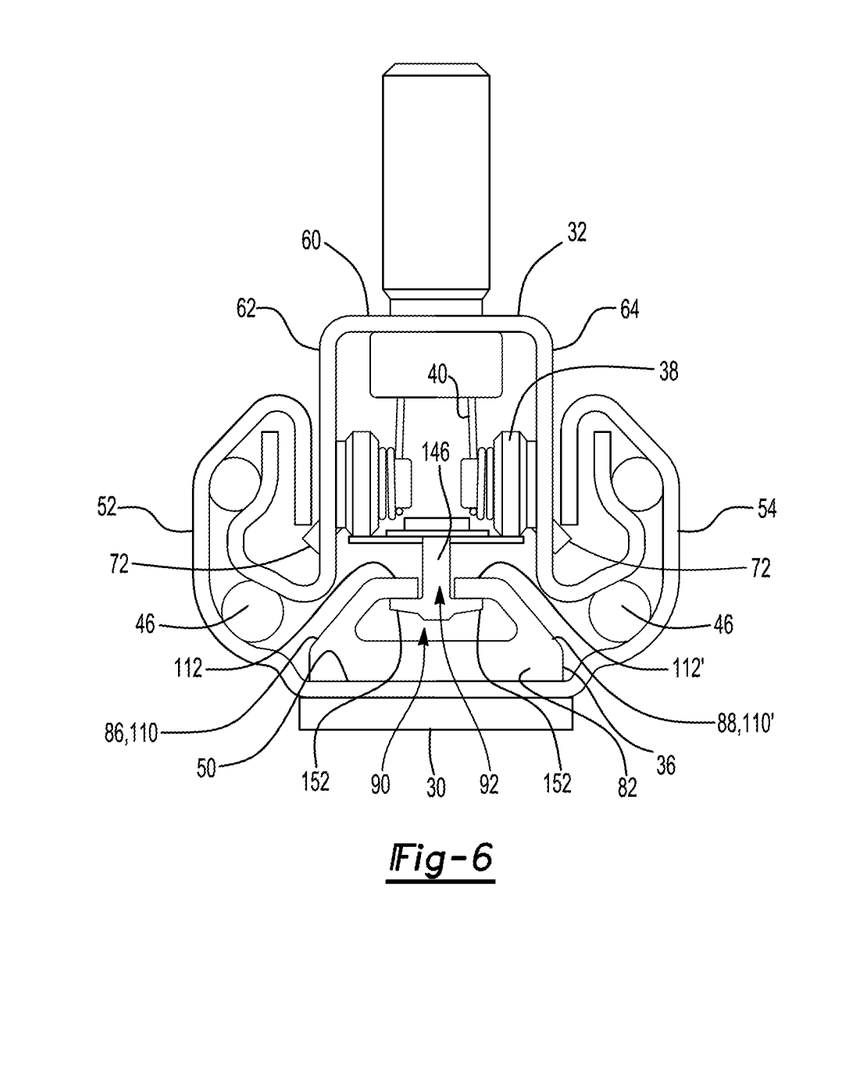
FIG. 6 is an end view of the seat track mechanism of FIG. 5.

In the unlocked position, the lock plate 70 may be disengaged from the lower track 30 to permit axial movement of the upper track 32 with respect to the lower track 30. For example, the lock plate 70 may be rotated or otherwise actuated such that a locking arm 72 may not be received in a notch in the lower track 30 when the lock plate 70 is in the unlocked position. An example of such positioning is shown in FIG. 6.

Figure 8:
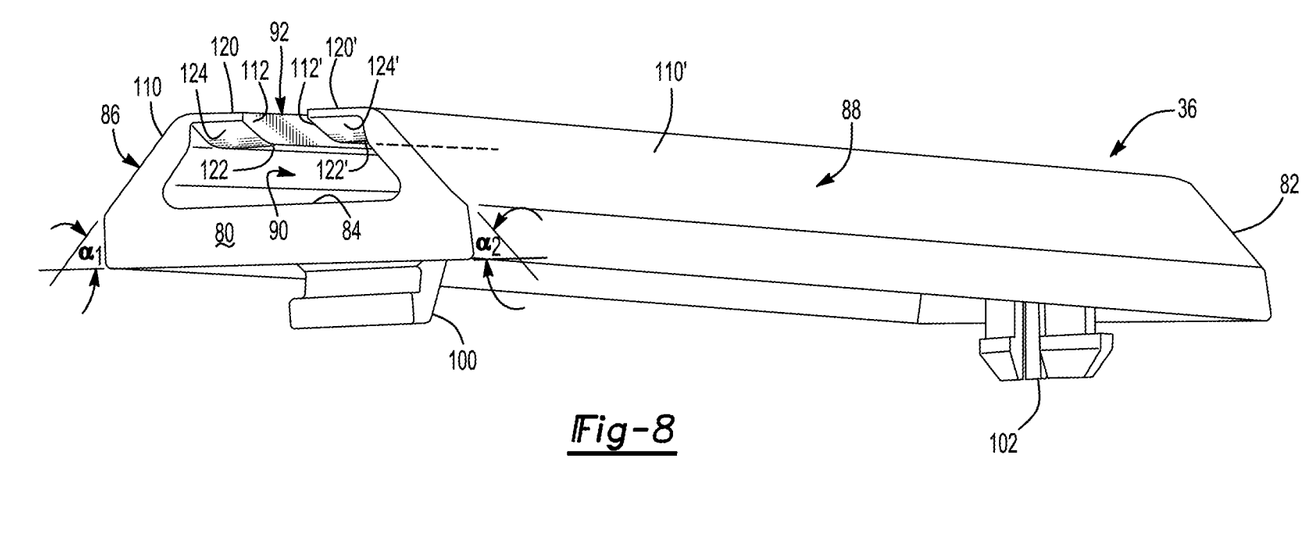
FIG. 8 is a perspective view of the retainer bracket.

Referring to FIGS. 3, 4 and 8, the retainer bracket 36 may be received in the lower track 30. For example, the retainer bracket 36 may be disposed on an interior side of the bottom wall 50 and may be coupled to the bottom wall 50 of the lower track 30. In addition, the retainer bracket 36 may be laterally positioned between the first side wall 52 and the second side wall 54 of the lower track 30. The retainer bracket 36 may have an axial length that may be less than the axial length of the lower track 30. In addition, the retainer bracket 36 may be disposed near an end of the lower track 30. The retainer bracket 36 may be made of any suitable material. For instance, the retainer bracket 36 may be made of a polymeric material such as plastic. In at least one configuration, the retainer bracket 36 may include a first retainer bracket end surface 80, a second retainer bracket end surface 82, a bottom retainer bracket wall 84, a first retainer bracket side wall 86, a second retainer bracket side wall 88, a slot 90, and a slot opening 92.

The first retainer bracket end surface 80 may be disposed at a first end of the retainer bracket 36. The first retainer bracket end surface 80 may face toward the track locking mechanism 34.

The second retainer bracket end surface 82 may be disposed at a second end of the retainer bracket 36. As such, the second retainer bracket end surface 82 may be disposed opposite the first retainer bracket end surface 80 and may face away from the track locking mechanism 34.

The bottom retainer bracket wall 84 may extend from the first retainer bracket end surface 80 to the second retainer bracket end surface 82. In at least one configuration, the bottom retainer bracket wall 84 may be disposed generally parallel to the bottom wall 50 of the lower track 30. The bottom retainer bracket wall 84 may also extend between or may extend from the first retainer bracket side wall 86 to the second retainer bracket side wall 88.

The bottom retainer bracket wall 84 may be disposed on or may be supported by the lower track 30. For example, the bottom retainer bracket wall 84 may engage or contact the bottom wall 50 of the lower track 30 and may be fixedly secured to the lower track 30 in any suitable manner. For instance, one or more fasteners may be provided to attach the retainer bracket 36 to the bottom wall 50 of the lower track 30. The fasteners may have any suitable configuration. For example, a fastener may be configured as a separate component from the retainer bracket 36 or may be integrally formed with the retainer bracket 36. Examples of fasteners include but are not limited to bolts, clips, and the like. In FIGS. 3 and 8, two examples of fasteners are shown. One fastener 100 is configured as a hook that may extend through an opening in the bottom wall 50 to couple the retainer bracket 36 to the lower track 30. The other fastener 102 is configured as a snap lock feature that may be compressed when inserted into a hole in the bottom wall 50 and may expand outward past the hole to secure the retainer bracket 36 when the snap lock feature exits the hole in the bottom wall 50.

Referring primarily to FIGS. 4 and 8, the first retainer bracket side wall 86 may extend from the bottom retainer bracket wall 84 in a generally upward direction or in a direction that extends away from the bottom wall 50 of the lower track 30. In at least one configuration, the first retainer bracket side wall 86 may include a first portion 110 and a second portion 112.

The first portion 110 may extend from the bottom retainer bracket wall 84. For example, the first portion 110 of the first retainer bracket side wall 86 may extend from a first lateral end of the bottom retainer bracket wall 84. The first portion 110 may extend at an oblique angle $\alpha_1$ from the bottom wall 50 of the lower track 30 such that the first portion 110 may extend away from the first side wall 52 of the lower track 30 and toward the center of the seat track mechanism 16 so as to avoid contact with the upper track 32. As a nonlimiting example, the oblique angle may be between 25 and 75 degrees.

The second portion 112 may extend from an end of the first portion 110. More specifically, the second portion 112 may extend from an end of the first portion 110 such that the second portion 112 is disposed above and is spaced apart from the bottom retainer bracket wall 84. For example, the second portion 112 may extend in a substantially horizontal direction that may extend away from the first side wall 52 of the lower track 30. As is best shown in FIG. 4, the second portion 112 may be at least partially received inside the upper track 32 between the first side wall 62 and the second side wall 64. In at least one configuration, the second portion 112 may include an upper surface 120, a lower surface 122, and a ramp surface 124 as is best shown in FIG. 8.

The upper surface 120 may face away from the bottom retainer bracket wall 84. The upper surface 120 may face toward and may be received in the upper track 32.

The lower surface 122 may be disposed opposite the upper surface 120. The lower surface 122 may face toward and may be spaced apart from the bottom retainer bracket wall 84. In addition, the lower surface 122 may be spaced apart from and may be disposed parallel to the upper surface 120 in one or more embodiments.

Referring primarily to FIGS. 3 and 8, the ramp surface 124 may be disposed proximate the first retainer bracket end surface 80. In at least one configuration, the ramp surface 124 may extend from the first retainer bracket end surface 80 in a longitudinal direction toward the second retainer bracket end surface 82. The ramp surface 124 may help guide a latch arm of the lever 38 into the slot 90. For example, the ramp surface 124 may extend at an angle, such as an oblique angle, with respect to the upper surface 120 and the lower surface 122. In such a configuration, the ramp surface 124 may be generally planar and may extend from the upper surface 120 toward the lower surface 122 such that the ramp surface 124 becomes progressively closer to the lower surface 122 in an axial direction that extends away from the first retainer bracket end surface 80.

The second retainer bracket side wall 88 may be configured as a mirror image of the first retainer bracket side wall 86. As such, the second retainer bracket side wall 88 may be disposed opposite the first retainer bracket side wall 86 and may extend in a generally upward direction from the bottom retainer bracket wall 84. The second retainer bracket side wall 88 may also include a first portion 110' and a second portion 112'.

The first portion 110' may extend from the bottom retainer bracket wall 84. For example, the first portion 110' of the second retainer bracket side wall 88 may extend from a second lateral end of the bottom retainer bracket wall 84 that may be disposed opposite the first lateral end. The first portion 110' may extend at an oblique angle as from the bottom wall 50 of the lower track 30 such that the first portion 110' may extend away from the second side wall 54 of the lower track 30 and toward the center of the seat track mechanism 16 to avoid contact with the upper track 32.

The second portion 112' may extend from an end of the first portion 110'. More specifically, the second portion 112' may extend from an end of the first portion 110' such that the second portion 112' is disposed above and is spaced apart from the bottom retainer bracket wall 84. For example, the second portion 112' may extend in a substantially horizontal direction that may extend away from the second side wall 54 of the lower track 30. As such, the second portion 112' may extend toward the second portion 112 of the first retainer bracket side wall 86 but may be spaced apart from the second portion 112. As is best shown in FIG. 4, the second portion 112' may be at least partially received inside the upper track 32 between the first side wall 62 and the second side wall 64. In at least one configuration, the second portion 112' may include an upper surface 120', a lower surface 122', and a ramp surface 124' that are analogous to the upper surface 120, lower surface 122, and ramp surface 124 of the second portion 112 of the first retainer bracket side wall 86.

Figure 5:
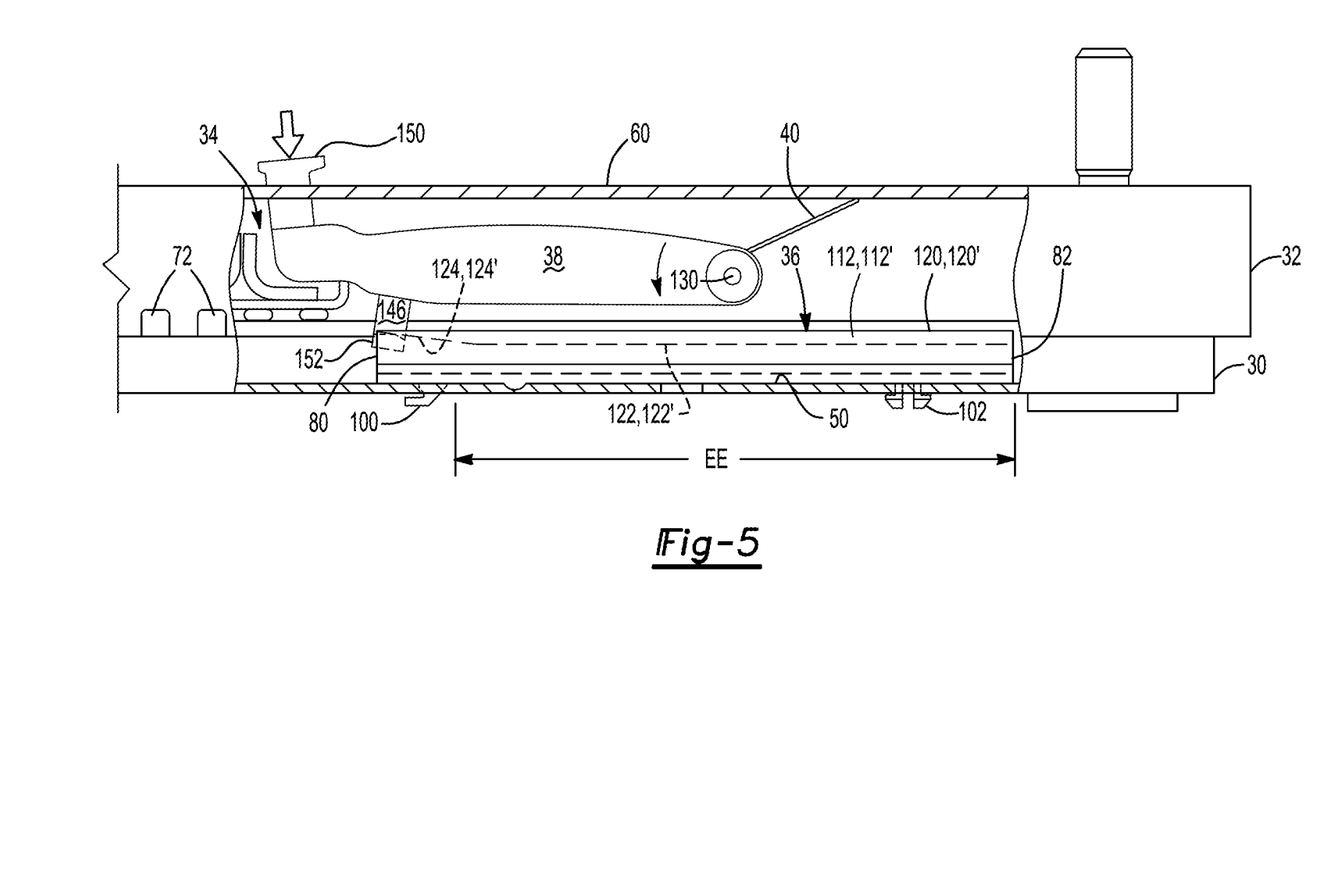
FIG. 5 is a section view of the seat track mechanism showing the lever in a second position.

The slot 90 may be defined by the retainer bracket 36. For example, the slot 90 may extend axially or in a longitudinal direction from the first retainer bracket end surface 80 toward or to the second retainer bracket end surface 82 and may be bounded by the bottom retainer bracket wall 84, the first retainer bracket side wall 86, and the second retainer bracket side wall 88. The slot 90 may be disposed above the bottom retainer bracket wall 84, below the second portions 112, 112', and may be laterally positioned between the first portions 110, 110' of the first retainer bracket side wall 86 and the second retainer bracket side wall 88, respectively. The slot 90 may selectively receive a latch arm of the lever 38 to hold the lever 38 in a second position as will be discussed in more detail below. In at least one configuration, the slot 90 may have a substantially constant cross-sectional profile between the ramp surfaces 124, 124' and the second retainer bracket end surface 82. The cross-sectional profile of the slot 90 has a generally trapezoidal shape in the configuration shown. The slot 90 may also define an easy entry travel range EE as is best shown in FIGS. 3 and 5.

The slot opening 92 may be defined by the second portion 112 of the first retainer bracket side wall 86 and the second portion 112' of the second retainer bracket side wall 88. More specifically, the slot opening 92 may be laterally positioned between the second portion 112 of the first retainer bracket side wall 86 and the second portion 112' of the second retainer bracket side wall 88 and may extend to the slot 90. The slot opening 92 may extend from the upper surfaces 120, 120' to the lower surfaces 122, 122' of the second portions 112, 112' and may have a smaller width than the slot 90.

Referring primarily to FIGS. 3 and 7, the lever 38 is shown. The lever 38 may be made of any suitable material, such as a polymeric material like plastic. The lever 38 may be pivotally coupled to the upper track 32. For instance, the lever 38 may be at least partially received in the upper track 32 and may be pivotable about a lever axis 130. In at least one configuration, the lever 38 may include a center portion 132, a first arm 134, a second arm 136, a third arm 138, a fourth arm 140, a first cross wall 142, a second cross wall 144, and a latch arm 146.

The center portion 132 may be disposed proximate the middle of the lever 38. The center portion 132 may provide a structure from which arms of the lever 38 may extend.

The first arm 134 may extend from the center portion 132 toward the track locking mechanism 34. The first arm 134 may be disposed adjacent to and may extend generally parallel to the first side wall 62 of the upper track 32. The first arm 134 may be spaced apart from the second arm 136.

The second arm 136 may also extend from the center portion 132 toward the track locking mechanism 34. The second arm 136 may be disposed adjacent to and may extend generally parallel to the second side wall 64 of the upper track 32. The second arm 136 may be configured as a mirror image of the first arm 134. As such, the second arm 136 may be disposed parallel to the first arm 134.

The third arm 138 may extend from the center portion 132 in a direction that extends away from the track locking mechanism 34. The third arm 138 may be disposed opposite the first arm 134. In addition, the third arm 138 may be disposed adjacent to and may extend generally parallel to the first side wall 62 of the upper track 32. The third arm 138 may be pivotally coupled to the first side wall 62 in a manner that facilitates rotation of the lever 38 about the lever axis 130 with respect to the upper track 32.

The fourth arm 140 may also extend from the center portion 132 in a direction that extends away from the track locking mechanism 34. The fourth arm 140 may be disposed opposite the second arm 136. In addition, the fourth arm 140 may be disposed adjacent to and may extend generally parallel to the second side wall 64 of the upper track 32. The fourth arm 140 may be pivotally coupled to the second side wall 64 of the upper track 32 in a manner that facilitates rotation of the lever 38 about the lever axis 130.

The first cross wall 142 may extend from the first arm 134 to the second arm 136. In at least one configuration, the first cross wall 142 may be spaced apart from the center portion 132 and may be disposed proximate the bottom or bottom sides of the first arm 134 and the second arm 136. As is best shown in FIG. 7, the first cross wall 142 may be axially positioned closer to the center portion 132 than the second cross wall 144.

The second cross wall 144 may extend from the first arm 134 to the second arm 136. In at least one configuration, the second cross wall 144 may be spaced apart from the center portion 132 and the first cross wall 142. The second cross wall 144 may be disposed proximate the top or top sides of the first arm 134 and the second arm 136. An actuation feature 150 may extend from the second cross wall 144. The actuation feature 150 may extend from a top side of the second cross wall 144 through a hole in the top wall 60 of the upper track 32. The actuation feature 150 may allow force to be applied to actuate the lever 38 from outside of the upper track 32.

The latch arm 146 may extend toward the lower track 30. For example, the latch arm 146 may extend from a bottom side of the first cross wall 142 toward the bottom wall 50 of the lower track 30. The latch arm 146 may be spaced apart from the lower track 30 and the upper track 32. As is best shown in FIGS. 4 and 6, the latch arm 146 may be laterally positioned in line with the slot 90 and slot opening 92 of the retainer bracket 36. In at least one configuration, the latch arm 146 may have an L or T-shaped cross-sectional profile. In FIGS. 4 and 6, the latch arm 146 may look like in inverted capital letter T from the perspective shown and may include a pair of laterally extending portions 152. The laterally extending portions 152 may extend in opposite directions and may be coplanar.

Referring to FIGS. 3 and 7, the biasing member 40 may exert a biasing force on the lever 38. For example, the biasing member 40 may urge the lever 38 to rotate toward the top wall 60 of the upper track 32 or in a clockwise direction from the perspective shown in FIG. 3. In at least one configuration, the biasing member 40 may be coupled to the third arm 138 and the fourth arm 140 and may extend to the top wall 60.

Referring to FIGS. 3-6, operation of the seat track mechanism 16 will now be described in more detail.

Referring to FIGS. 3 and 4, the lever 38 is shown in a first position. The latch arm 146 may located above the retainer bracket 36 when the lever 38 is in the first position. As such, the latch arm 146 may not be received in the slot 90 or may not be positioned to be receivable by the slot 90 of the retainer bracket 36. Moreover, the bottom side of the laterally extending portions 152, 152 that face toward the bottom wall 50 of the lower track 30 may be positioned above the upper surfaces 120, 120' of the second portions 112, 112' of the first and second retainer bracket side walls 86, 88. As such, the latch arm 146 may be disposed between the first side wall 62 and the second side wall 64 of the upper track 32 when the lever 38 is in the first position as is best shown in FIG. 4. The upper surfaces 120, 120' may prevent the latch arm 146 from entering the slot 90 when the latch arm 146 is positioned above the retainer bracket 36 even if force is applied to rotate the lever 38 from the first position toward the second position as the bottom side of the laterally extending portions 152 may contact the upper surfaces 120, 120'. A lock plate 70 may be disposed in the locked position when the lever 38 is in the first position. The lever 38 may also be spaced apart from the lock plate 70.

Referring to FIGS. 5 and 6, the lever 38 is shown in a second position. The lever 38 may move from the first position to the second position when sufficient force is exerted on the lever 38 to overcome the biasing force of the biasing member 40. For instance, the lever 38 may move from the first position to the second position when sufficient downward force is applied to the actuation feature 150, thereby causing the lever 38 to rotate or pivot about the lever axis 130 from the first position to the second position. Force may be applied to the actuation feature 150 by an actuator that may have any suitable configuration. For instance, the actuator may be a mechanical, electromechanical or electrical actuator. As a nonlimiting example, a release handle on the seat back 12 may be used as an actuator and may be operatively connected to the actuation feature 150 by one or more linkages, such as a cable, lever, or combinations thereof. Pulling the release handle may also unlock the recliner mechanisms and allow the seat back 12 to pivot forward with respect to the seat bottom 14 in a manner known by those skilled in the art.

Rotation of the lever 38 may move the latch arm 146 toward the bottom wall 50 of the lower track 30. This rotation may have two main effects.

First, the lever 38 may actuate the lock plate 70 from the locked position to the unlocked position. For instance, the lever 38 may engage or exert force on the lock plate 70 that may cause the lock plate 70 to rotate or otherwise move in a manner that disengages a lock plate 70 and its locking arms 72 from the lower track 30, thereby permitting the upper track 32 to slide along the longitudinal axis 24 with respect to the lower track 30.

Second, rotation of the lever 38 may position the latch arm 146 to enter the slot 90 and slot opening 92 of the retainer bracket 36. The top side of the laterally extending portions 152 of the latch arm 146 may move to a position located below the upper surfaces 120, 120' of the first and second retainer bracket side walls 86, 88. As such, the laterally extending portions 152 of the latch arm 146 may contact the second portion 112, 112' of the first retainer bracket side wall 86, the second retainer bracket side wall 88, or both to hold the lever 38 in the second position when the latch arm 146 is received in the slot 90. As is best shown in FIG. 4, the latch arm 146 may extend below the first side wall 52 and second side wall 54 of the lower track 30 and may be spaced apart from the first portions 110, 110' of the first and second retainer bracket side walls 86, 88 when the lever 38 is in the second position. As such, the ramp surfaces 124, 124' may help guide the laterally extending portions 152 into the slot 90 as the upper track 32 moves with respect to the lower track 30 to the right from the perspective shown in FIG. 5 and into the easy entry travel range EE. The lower surfaces 122, 122' may then contact and hold the laterally extending portions 152 of the latch arm 146 in the slot 90 when the latch arm 146 is located between the first retainer bracket end surface 80 and the second retainer bracket end surface 82, thereby preventing the lever 38 from rotating back to the first position. Thus, the latch arm 146 may hold the lock plate 70 in the unlocked position when the latch arm 146 is received in the slot 90 in the retainer bracket 36. The upper track 32 may be freely movable with respect to the lower track 30 throughout the easy entry travel range EE. Accordingly, actuating the release handle may allow the seat back 12 to pivot forward and allow the seat back 12, seat bottom 14, and upper track 32 to move together in a forward direction along the longitudinal axis 24 to increase the amount of space available behind the seat assembly 10 to make it easier for passengers to enter or exit the vehicle.

The actuation sequence may be generally reversed to move from the position shown in FIG. 5 back to the position shown in FIG. 3. For instance, force may be exerted on the seat back 12 to push the seat back 12, seat bottom 14, and upper track 32 in a rearward direction along the longitudinal axis 24. After sufficient movement occurs, the latch arm 146 may exit the slot 90 in the retainer bracket 36. The lever 38 may then rotate back to the first position under the biasing force of the biasing member 40, which may then permit the lock plate 70 to enter the notches of the lower track 30 and reengage the lower track 30 to inhibit axial movement of the upper track 32 with respect to the lower track 30.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A seat track mechanism comprising:
a lower track;
an upper track that is received in the lower track and is slidable with respect to the lower track;
a lever that is received in the upper track and is pivotable between a first position and a second position, the lever having a latch arm that extends toward the lower track; and
a retainer bracket that is received in the lower track, wherein the retainer bracket defines a slot that receives the latch arm to hold the lever in the second position, wherein the retainer bracket has a first retainer bracket end surface, and a first retainer bracket side wall that extends from a bottom retainer bracket wall that is disposed on a bottom wall of the lower track, the first retainer bracket side wall having a first portion that extends from the bottom retainer bracket wall and a second portion that extends from an end of the first portion such that the second portion is spaced apart from the bottom retainer bracket wall, the second portion having an upper surface, a lower surface disposed opposite the upper surface, and a ramp surface that extends from the lower surface toward the upper surface such that the ramp surface becomes progressively closer to the lower surface un an axial direction that extends away from the first retainer bracket end surface, wherein the ramp surface is configured to guide the latch arm into the slot, wherein the latch arm contacts the second portion and is spaced apart from the first portion when the latch arm is received in the slot.

2. The seat track mechanism of claim 1 wherein the latch arm is not received in the slot when the lever is in the first position.

3. The seat track mechanism of claim 1 wherein the upper track has a top wall and first and second side walls that extend from the top wall toward the lower track, wherein the latch arm is disposed between the first and second side walls when the lever is in the first position and extends below the first and second side walls when the lever is in the second position.

4. The seat track mechanism of claim 1 wherein the lower track has a first side wall and a second side wall, the bottom wall extends from the first side wall to the second side wall, and the retainer bracket is disposed on the bottom wall between the first side wall and the second side wall of the lower track.

5. The seat track mechanism of claim 4 wherein the retainer bracket has a second retainer bracket side wall that is disposed opposite the first retainer bracket side wall, and the bottom retainer bracket wall extends between the first retainer bracket side wall and the second retainer bracket side wall.

6. The seat track mechanism of claim 5 wherein the first retainer bracket side wall extends at an oblique angle from the bottom wall such that the first retainer bracket side wall extends away from the first side wall of the lower track.

7. The seat track mechanism of claim 5 wherein the second retainer bracket side wall extends at an oblique angle from the bottom wall such that the second retainer bracket side wall extends away from the second side wall of the lower track and toward the first retainer bracket side wall, wherein the first retainer bracket side wall and the second retainer bracket side wall are partially received inside the upper track.

8. The seat track mechanism of claim 1 wherein the retainer bracket is coupled to the bottom wall.

9. The seat track mechanism of claim 1 wherein the retainer bracket has a hook that extends through the bottom wall and couples the retainer bracket to the lower track.

10. The seat track mechanism of claim 1 wherein the retainer bracket has a second retainer bracket end surface disposed opposite the first retainer bracket end surface and the slot extends from the first retainer bracket end surface to the second retainer bracket end surface.

11. The seat track mechanism of claim 1 wherein the latch arm holds a lock plate in an unlocked position when the latch arm is received in the slot in the retainer bracket.

12. The seat track mechanism of claim 1 wherein the lever has a center portion, a first arm and a second arm that are spaced apart from each other and extend from the center portion, and a first cross wall that extends from the first arm to the second arm, wherein the latch arm extends from the first cross wall.

13. The seat track mechanism of claim 12 wherein the lever has a second cross wall that extends from the first arm to the second arm and an actuation feature that is configured to facilitate actuation of the lever, wherein the actuation feature extends from the second cross wall through the upper track.

14. A seat track mechanism comprising:
a lower track;
an upper track that is received in the lower track and is slidable along an axis with respect to the lower track;
a lever that is pivotally coupled to the upper track and has a latch arm, the lever having a center portion, a first arm and a second arm that are spaced apart from each other and extend from the center portion, a first cross wall that extends from the first arm to the second arm, a second cross wall that extends from the first arm to the second arm, and an actuation feature that is configured to facilitate actuation of the lever, wherein the latch arm extends from the first cross wall and the actuation feature extends from the second cross wall through the upper track;
a retainer bracket that is received in and fixedly secured to the lower track, wherein the retainer bracket defines a slot; and
a track locking mechanism that has a lock plate that is arranged between the upper track and the lower track, wherein the lock plate is moveable between a locked position in which the lock plate engages the upper track and the lower track to inhibit axial movement of the upper track with respect to the lower track and an unlocked position in which the lock plate is disengaged from the lower track to permit axial movement of the upper track with respect to the lower track, wherein the lever is configured to engage the lock plate to actuate the lock plate from the locked position to the unlocked position and the latch arm holds the lock plate in the unlocked position.

15. The seat track mechanism of claim 14 wherein the retainer bracket has a ramp surface that is configured to guide the latch arm into the slot and that extends from a first retainer bracket end surface of the retainer bracket.

16. The seat track mechanism of claim 14 wherein the latch arm holds the lock plate in the unlocked position when the latch arm is received in the slot in the retainer bracket.

17. The seat track mechanism of claim 14 wherein the latch arm is spaced apart from the upper track and the lower track.

18. The seat track mechanism of claim 14 wherein the first cross wall is spaced apart from the second cross wall and the first cross wall is positioned in an axial direction closer to the center portion than the second cross wall.

19. A seat track mechanism comprising:
a lower track;
an upper track that is received in the lower track and is slidable along an axis with respect to the lower track;
a lever that is pivotally coupled to the upper track and has a latch arm, the lever having a center portion, a first arm and a second arm that are spaced apart from each other and extend from the center portion, a first cross wall that extends from the first arm to the second arm, a second cross wall that extends from the first arm to the second arm, and an actuation feature that is configured to facilitate actuation of the lever, wherein the latch arm extends through the upper track;
a retainer bracket that is received in the lower track, wherein the retainer bracket defines a slot; and
a track locking mechanism that has a lock plate that is arranged between the upper track and the lower track, wherein the lock plate is moveable between a locked position in which the lock plate engages the upper track and the lower track to inhibit axial movement of the upper track with respect to the lower track and an unlocked position in which the lock plate is disengaged from the lower track to permit axial movement of the upper track with respect to the lower track, wherein the lever is configured to engage the lock plate to actuate the lock plate from the locked position to the unlocked position, wherein the latch arm has a T-shaped cross-sectional profile.

20. The seat track mechanism of claim 19 wherein the retainer bracket has a ramp surface that is configured to guide the latch arm into the slot and that extends from a first retainer bracket end surface of the retainer bracket.

* * * * *

UNITED STATES PATENT AND TRADEMARK OFFICE
CERTIFICATE OF CORRECTION

| | |
|---|---|
| PATENT NO. | : 11,440,441 B2 |
| APPLICATION NO. | : 16/840836 |
| DATED | : September 13, 2022 |
| INVENTOR(S) | : Slavomir Basarik et al. |

Page 1 of 1

It is certified that error appears in the above-identified patent and that said Letters Patent is hereby corrected as shown below:

In the Claims

Column 10, Line 21, Claim 1:
After "closer to the lower surface"
Delete "un"
Insert --in--.

Column 12, Lines 27-28, Claim 19:
After "wherein the latch arm extends"
Insert --from the first cross wall and the actuation feature extends from the second cross wall--.

Signed and Sealed this
Eighth Day of August, 2023

Katherine Kelly Vidal
*Director of the United States Patent and Trademark Office*